United States Patent
Heiligensetzer et al.

(10) Patent No.: US 7,031,807 B2
(45) Date of Patent: Apr. 18, 2006

(54) DEVICE AND METHOD FOR SECURING APPARATUSES WITH PARTS FREELY MOVABLE IN SPACE

(75) Inventors: Peter Heiligensetzer, Augsburg (DE); Fritz Steininger, Bad Liebenzell, DE (US)

(73) Assignee: KUKA Roboter GmbH, Augsburg (DE)

( * ) Notice: Subject to any disclaimer, the term of this patent is extended or adjusted under 35 U.S.C. 154(b) by 223 days.

(21) Appl. No.: 10/321,007

(22) Filed: Dec. 17, 2002

(65) Prior Publication Data

US 2003/0137219 A1  Jul. 24, 2003

(30) Foreign Application Priority Data

Dec. 19, 2001 (DE) ............... 101 62 412

(51) Int. Cl.
*G05D 16/00* (2006.01)
*B25J 19/06* (2006.01)

(52) U.S. Cl. .............. 700/301; 700/245; 700/260
(58) Field of Classification Search ............. 700/231, 700/245, 257, 260, 301, 60; 600/101, 424; 901/6, 36

See application file for complete search history.

(56) References Cited

U.S. PATENT DOCUMENTS

| | | | | |
|---|---|---|---|---|
| 3,725,918 A | * | 4/1973 | Fleischer et al. | 342/41 |
| 4,332,989 A | | 6/1982 | Nicolaisen | 200/47 |
| 4,733,068 A | * | 3/1988 | Thiele et al. | 250/227.14 |
| 4,751,658 A | * | 6/1988 | Kadonoff et al. | 701/301 |
| 4,968,878 A | * | 11/1990 | Pong et al. | 250/221 |
| 5,280,622 A | * | 1/1994 | Tino | 700/255 |
| 5,373,245 A | * | 12/1994 | Vranish | 324/662 |
| 5,400,244 A | * | 3/1995 | Watanabe et al. | 701/28 |
| 5,549,439 A | * | 8/1996 | Ploem | 414/680 |
| 5,604,318 A | | 2/1997 | Fasshauer | 73/862.624 |
| 5,744,728 A | | 4/1998 | Suita et al. | 73/862.542 |
| 5,867,800 A | * | 2/1999 | Leif | 701/23 |
| RE36,772 E | * | 7/2000 | Vranish et al. | 340/870.37 |
| 6,481,515 B1 | * | 11/2002 | Kirkpatrick et al. | 180/65.1 |
| 6,515,614 B1 | * | 2/2003 | Sakai et al. | 342/70 |
| 6,676,460 B1 | * | 1/2004 | Motsenbocker | 440/1 |
| 6,748,298 B1 | * | 6/2004 | Heiligensetzer | 700/260 |
| 6,760,647 B1 | * | 7/2004 | Nourbakhsh et al. | 700/245 |

FOREIGN PATENT DOCUMENTS

CH          682 351          8/1993

(Continued)

*Primary Examiner*—Thomas M. Dougherty
(74) *Attorney, Agent, or Firm*—McGlew & Tuttle, PC

(57) ABSTRACT

The invention relates to a safety device for apparatuses having parts freely movable in space, particularly handling equipment such as industrial robots or driverless transportation means, as well as a method for securing such apparatuses by means of such a safety device. The apparatuses have switching means which in the case of a collision of the moving parts with persons or objects emit a control signal through which the moving parts can be stopped or an emergency program can be started up, which brings about a movement sequence opposing the approach movement. The invention is characterized in that the safety device is constructed in the form of a tactile sensor system formed from optical waveguides and located on moving parts of the apparatus.

14 Claims, 3 Drawing Sheets

FOREIGN PATENT DOCUMENTS

| | | |
|---|---|---|
| DE | 37 15 693 | 9/1988 |
| DE | 40 06 119 C2 | 8/1991 |
| DE | 44 28 650 A1 | 2/1996 |
| EP | 0 012 383 A1 | 6/1980 |
| EP | 0 264 350 A1 | 4/1988 |
| EP | 0 689 903 A1 | 1/1996 |
| EP | 0 725 710 B1 | 8/1996 |
| FR | 2 595 441 | 9/1987 |
| JP | 10249785 | 9/1998 |
| WO | WO 86/02506 | 4/1986 |

* cited by examiner

DEVICE AND METHOD FOR SECURING APPARATUSES WITH PARTS FREELY MOVABLE IN SPACE

FIELD OF THE INVENTION

The invention firstly relates to a safety device for apparatuses with parts freely movable in space, particularly for handling means such as industrial robots or driverless transportation equipment with switching means, which in the case of a collision of the moving parts with persons or objects emit a control signal making it possible to stop the moving parts or to start up an emergency program bringing about a movement sequence opposing the approach movement and secondly a method for securing such apparatuses by means of the device according to the invention.

BACKGROUND OF THE INVENTION

In general, handling means, particularly industrial robots may only be operated under closely defined conditions in the presence of people. Thus, safety devices for the operation of apparatuses with parts freely movable in space, particularly for industrial robots, have hitherto had a strict separation of the working areas of people and machines. As a rule use is made of protective devices such as e.g. fences.

If access to the working area is necessary as a result of the process, movable separating protective devices (such as e.g. protective doors or flaps) or non-separating protective devices (such as e.g. laser scanners, switching mats; according to protection category 3 or 4, DIN EN 954-1) are used, which detect an access by an operator to the robot working area during active operation and emit a signal, which trips an alarm or stops the danger-bringing movement. The prior art also includes manual operation with a consent button under reduced speed.

The aforementioned switching mats make use of the physical effects occurring during the distortion of an optical waveguide. A corresponding apparatus is known from DE 44 28 650 A1. In the case of an optical waveguide located in a contact mat in the case of a limited compressive stress there is a change to the modal distribution of the radiation field, so that an appropriately positioned light detector can measure with high sensitivity compressive forces.

CH 682 351 A5/EP 264 350 describes one of the numerous conventional apparatuses used for securing the working area of installations. It discloses a process-controlled installation with associated monitoring circuit and a safety circuit, which in particular has an access light and a door, by means of which access to the proximity of the robot is regulated and/or permanently monitored, so that in the case of an operator being positioned in the proximity thereof, only a stopping of the installation or creeping operation is possible.

EP 725 710 B1 discloses a further variant, in which an operator controls with a miniature model of the apparatus an apparatus movable in space through the starting of a miniature model of the object to be worked. A safety zone is defined around the apparatus in that the miniature model of the apparatus has a slightly larger scale than the object model. Collisions between the real apparatus and the object are supposed to be avoided "with absolute certainty." Additional safety devices able to detect or prevent collisions are not disclosed.

Such protective devices on the one hand represent a considerable cost factor and on the other the commissioning costs are considerable.

EP 12 383 discloses an installation with movable parts, which is provided with an electrically conductive plastic layer, which in the case of compressive loading is placed in a real manner on the moving parts of the installation between two electrode layers. Between the resulting sensor system and the installation parts can be provided a deformable layer.

EP 689 903 discloses a robot with a coating of a viscoelastic material and on or below the surface are located pressure sensors for detecting collisions.

A capacitive sensor system is also known from DE 40 06 119 C2. This document relates to a capacitive displacement pick-up system with a capacitor controllable from the outside, which has an active electrode, a ground or earth electrode and a shielding electrode located between the active electrode and the ground electrode and which is at the same electrical potential as the active electrode.

A similar apparatus is known from EP 518 836 A1. WO 86/02506 relates to an approach detector of a capacitive nature for use in connection with elevator or lift doors. This document also discloses a capacitive sensor with a three-electrode arrangement, which also has a three-dimensionally directed detection sensitivity.

Such capacitive sensors measure capacitance changes, which are caused in the electric field of the capacitor formed by the sensor as a result of the approach of an object. In addition to all electrically good conducting materials, capacitive sensors only detect those materials having an adequately high permittivity.

The fact that a capacitive sensor system is unable to detect all material types is disadvantageous with respect to use as a safety device in the case of rapidly moving apparatuses with solid parts moved freely in space. In this connection a complete system is desirable, which permits a reliable human-machine cooperation.

The problem of the invention is to provide a safety device for the operation of apparatuses with parts freely movable in space, which permits the reliable and safe operation of such apparatuses without complicated and costly peripherals and which also ensures that collisions between apparatus parts and humans or objects are detected reliably at an early stage, so that in addition to avoiding planning and production costs there is a considerably reduced space requirement for such installations, so that in future people and machines can jointly use working areas.

SUMMARY OF THE INVENTION

In the case of a safety device according to the preamble, the invention solves this problem by a tactile sensor system of optical waveguides, which, outside a housing of the apparatus, is located on movable parts thereof.

The problem is also solved by a method in which in the case of contact between a movable part of the apparatus there is an influence to electromagnetic radiation guided by optical waveguides forming a tactile sensor system and located on said part, so that at least one control signal is emitted for bringing about at least one safety-relevant action. According to the invention the disadvantages of the prior art are avoided in that a specific tactile sensor system is installed on the moving parts of an apparatus. The tactile system responds in the case of contact with a person or an object. The inventive tactile optical sensor system with optical waveguides can be easily fitted to the non-smooth structures and surfaces in connection with a robot. This also provides security against electromagnetic stray radiation, which can cause false tripping.

The tactile sensor system according to the invention in the form of a tactile skin can be placed directly on the apparatus housing. To prevent damage by mechanical actions, according to a preferred development, the tactile sensor system is protected with respect to the outside by a shock absorbing, partly elastic layer.

However, it is also possible according to the invention to place the tactile sensor system outside and on the shock absorbing, partly elastic layer surrounding the housing, which brings about a greater proximity of the sensor means to the object to be detected.

According to another embodiment of the invention the layer surrounding the housing parts or the housing parts and the tactile sensor system is constructed in a resilient, damping manner. The resilience leads to a stopping path gain, so that a hard impact does not occur immediately after the first contact. If the layer has damping characteristics, the kinetic energy is decreased and the acting force remains limited over a longer path. This makes it possible to operate the apparatus faster. For this purpose the shock absorbing, partly elastic layer is made from a material with a mechanical efficiency between 0.5 and 0.7 and in particular 0.6. According to a preferred development of the invention use is made of a soft polyurethane foam, which absorbs and converts into heat considerable proportions of the kinetic energy which occurs.

The safety device according to the invention is more particularly characterized by its high detection sensitivity, because in an advantageous development of the invention the tactile sensor system formed from optical waveguides responds as from a force action of 0.5 to 1.5 N, particularly 1 N.

According to a particularly preferred development of the invention a contactless sensor system is provided. In particular in conjunction with the tactile system, in this way it is possible to create a redundant overall system, which is e.g. in the case of industrial robots sufficient to satisfy the requirements of category 3/4 of European standard DIN EN 954-1. The safety system incorporates a further sensor system independent of the tactile sensor system and which is detectable in contactless manner by humans or other objects with a high permittivity coefficient and which emits a safety-relevant control signal on approach, i.e. before a collision.

According to an advantageous development said further independent sensor system is a capacitive sensor system with at least one sensor element formed from two or more electrodes. It is in particular possible to use three-electrode systems having a grounded electrode, a sensor electrode and a shielding electrode located between them. As a result centimeter sensor ranges are obtained. The shielding electrode more particularly permits a directivity of the capacitive sensor. It reduces stray capacitances in the direction of the housing and improves approach sensitivity to a significant extent. Danger detection can be made largely redundant as a result of this additional system. As a result of the capacitive system it is possible to cover areas where the tactile system may not reliably respond. It also provides a good warning of approaches.

Water has an 81 times higher permittivity $\epsilon r$ than dry air. As a person consists of more than 2/3 of his weight from water, particularly through junction electrodes, he can be reliably detected up to a distance over 10 cm.

The capacitive sensor system formed from a plurality of sensor elements can have several junction sensor elements with corresponding junction electrodes. These sensor elements are advantageously subdivided into sectors, which makes it possible to block out the sectors individually or in groups, as soon as they are located within a permitted position provided by the control means. Thus, it is possible to avoid an undesired response of the capacitive sensor system in those cases where safety-relevant components move towards one another in permitted manner.

The subdivision of the capacitive sensor system into sectors provides the further advantage that it leads to a larger number of electrodes, which in each case have a smaller surface than the overall system. As the relative capacitance change on approaching the same object increases with a decreasing electrode surface size, the sensor means become more sensitive, more particularly against the approach of small objects.

According to the invention the electrodes of the capacitive sensor system are to be arranged asymmetrically and in a particularly advantageous development use is made of crimped on shielding electrodes. Thus, utilizing the directivity of the individual capacitive sensor elements it is possible to envelop in a closed sensor field at least the moving parts of the apparatus.

The directivity of the individual sensor elements can advantageously be utilized for preventing the undesired detection of internal and external electromagnetic interference sources and the detection of machine-side metal parts or parts with a high permittivity coefficient $\epsilon r$.

According to a preferred development at least parts of the capacitive sensor system are located outside the housing. This can take place either directly on the outer surface of the housing or even on the damping foam layer. Thus, in addition to a greater proximity to the object to be detected, this makes it possible to achieve a greater spacing with respect to internal interference sources, e.g. motor power electronics.

However, it is also conceivable to place components of the capacitive sensor system within the apparatus housing. This is particularly advantageous if safety-relevant apparatus components move very closely past one another, so that for space reasons the installation of any sensor systems on the housing surface is impossible. In connection with such a design the housing is advantageously made from a material with a low permittivity coefficient, which can in particular be achieved through the use of plastic.

According to another preferred development of the inventive teaching the arrangement of the tactile sensor system, the capacitive sensor system and the shock absorbing, partly elastic layer takes place in the form of layers locally plane-parallel to the housing and whose sequence can vary with respect to the housing.

Advantageously the two independent sensor systems, i.e. the tactile sensor system and the capacitive sensor system, act directly in the emergency off circuit of the apparatus. The possible control signals of the two sensor systems are preferably interconnected in the sense of a logic OR operation, i.e. a safety-relevant action is brought about, e.g. a stopping of the apparatus, an initiation of a movement sequence opposing the collision movement and/or the triggering of an optical and/or acoustic alarm, if one of the two ORs bring about control signals.

According to an extremely advantageous development of the invention all the sensor faces bring about cyclic self-control by starting a safety program, particularly by the approach of a testpiece during a control run.

It is also advantageously possible according to the invention to combine the tactile and capacitive sensor system with a third system, which is constructed as a motor current monitoring system for monitoring motor currents in the electric motors present in the apparatus for moving the moving parts. Such a motor current monitoring system records the rise of the motor currents above the value expected in the collision-free normal case and in this case emits a control signal which stops the danger-bringing movement or initiates an opposing movement.

It is also possible to combine the safety device according to the invention with a force-moment sensor, which in a preferred development is located between the apparatus and tools located on the latter and with the aid of which it is possible to detect collisions through the occurrence of unexpected forces and moments.

The two last-mentioned systems, i.e. the motor current monitoring system and the force-moment sensor together provide a separate, redundant system satisfying the safety requirements according to category 2 of DIN EN 954-1. According to a preferred development the control signals of these two sensor systems are interconnected in the sense of a logic OR operation.

According to the invention the safety functions of said separate redundant system is monitored by a machine program, the apparatus being moved against a resistance. For as long as the motor current monitoring system and the force-moment sensor, independently of one another, establish the exceeding of standard values, the overall system is still operating in a satisfactory manner.

BRIEF DESCRIPTION OF THE DRAWINGS

In connection with the various possibilities of advantageously designing and further developing the object of the present invention in an advantageous manner, reference is made to the following claims and the description of embodiments in connection with the drawings, wherein show:

DETAILED DESCRIPTION OF THE DRAWINGS

Figure 1:
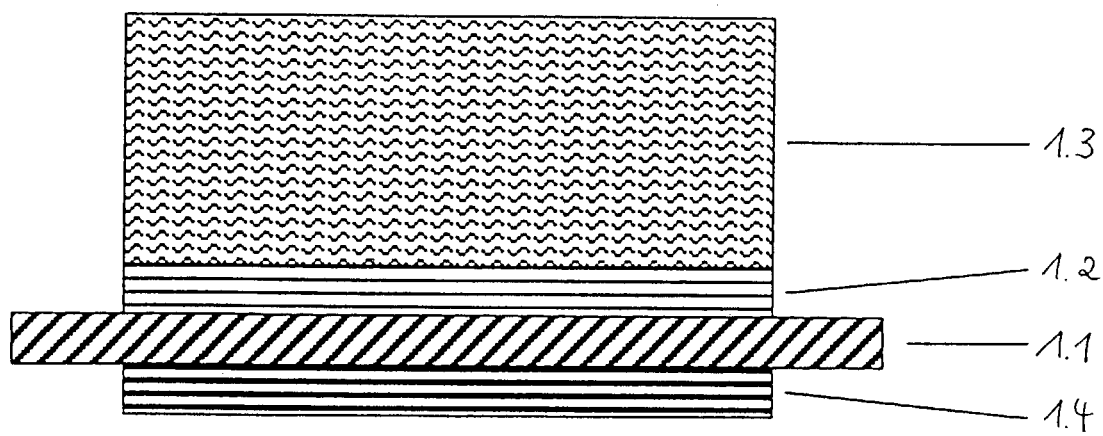
FIG. 1 A diagrammatic sectional view of the arrangement of the sensor and damping layers relative to the apparatus housing.

FIG. 1 shows in a diagrammatic sectional view an example of a possible arrangement of the sensor and damping layers of the inventive safety device with respect to the housing or housing parts of the apparatus.

A housing part 1.1 of a movable part 2.2 of the apparatus 2.1, such as a robot arm (part) of a robot (apparatus) is represented in the form of a locally planar plate. Above the housing part 1.1, i.e. outside the apparatus 2.1 is located a tactile sensor system 1.2, which in the embodiment shown is outwardly protected by a shock absorbing, partly elastic layer 1.3. Below the housing part 1.1, i.e. inside the apparatus 2.1 is provided a capacitive sensor system 1.4, the arrangement of the tactile sensor system 1.2, damping layer 1.3 and capacitive sensor system 1.4 taking place in plane-parallel, superimposed layers with respect to the housing part 1.1.

With respect to the housing part 1.1, the layer sequence can vary. Thus, it is e.g. possible to place the capacitive sensor system 1.4 wholly or partly outside the housing part 1.1. The possibility also exists of placing the tactile sensor system 1.2 and/or the capacitive sensor system 1.4 or parts thereof outside the damping layer 1.3, so as to reduce the distance between the sensor systems and an object to be detected.

The damping layer 1.3 is preferably made from a material, which is able to dissipate kinetic energy by deformation, so that both the apparatus 2.1 and the collision partner are provided during a collision.

Figure 2:
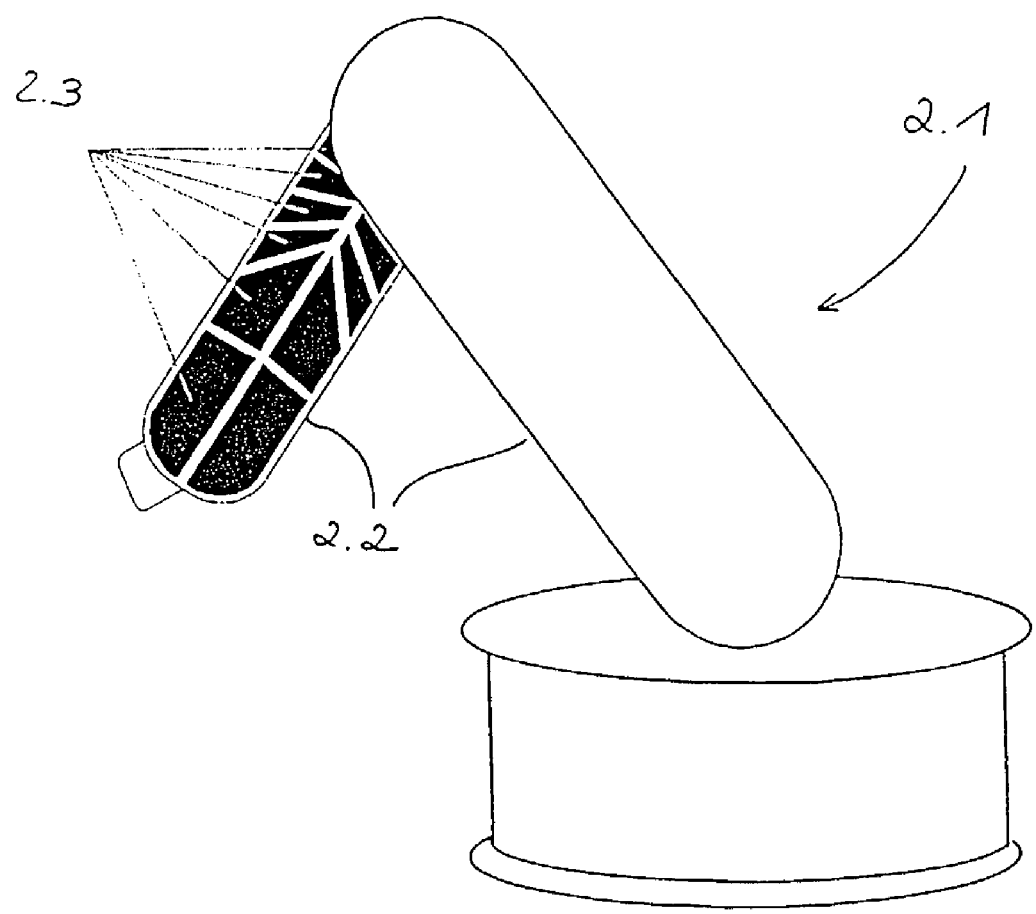
FIG. 2 A diagrammatic representation of an apparatus to be monitored and the sensor arrangement in an embodiment of the inventive capacitive sensor system.

FIG. 2 diagrammatically shows an apparatus 2.1 to be monitored with parts 2.2 freely movable in space and the arrangement of sensors of the capacitive sensor system 1.4 according to the invention.

The diagrammatic representation of an apparatus 2.1 comprises a plurality of parts 2.2 freely movable in space. On one of said moving parts 2.2 there are individual sector-like sensor elements 2.3 of the capacitive sensor system 1.4. The individual sensor elements 2.3 are constructed in a real manner with differing geometry.

Through the subdivision of a capacitive sensor face into a plurality of smaller sectors 2.3 there is an increase in the detection sensitivity of the capacitive sensor system 1.4. Moreover, with the aid of an individually constructed directional characteristic of the sectors 2.3 it is possible to achieve a complete enveloping in a capacitive sensor field of at least the movable parts 2.2 of the apparatus 2.1 to be monitored. The sector-like construction 2.3 of the capacitive sensor system 1.4 also allows a selective blocking out of individual sectors 2.3, so that in the case of a permitted approach of movable parts 2.2 of the apparatus 2.1 no undesired control signal is emitted.

Figure 3:
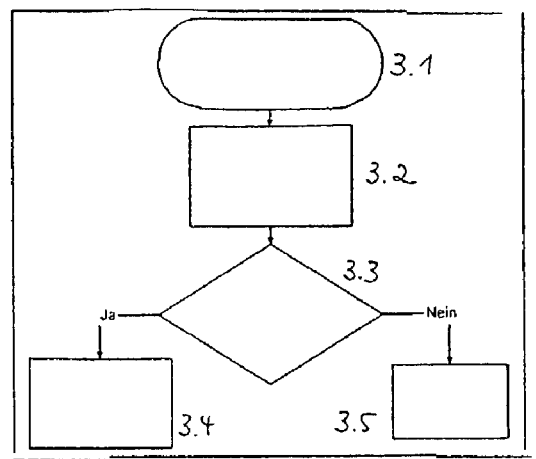
FIG. 3 A flow diagram of an inventive safety program for cyclic self-control of all sensor faces of the safety device.

FIG. 3 shows the flow chart of a safety program according to the invention for the cyclic self-control of all the sensor faces of the safety device.

A control of the sensor faces takes place within the framework of a control run, e.g. by approaching a testpiece. The start of this control run takes place in regular time intervals, e.g. every 24 hours 3.1. The apparatus 2.1 deliberately triggers the safety function from 3.2. This is followed by a check 3.3 to establish whether the safety devices have reacted correctly. If this is the case the apparatus 2.1 is ready for automatic operation 3.4. In the case of incorrectly reacting safety devices an alarm message 3.5 is emitted.

Figure 4:
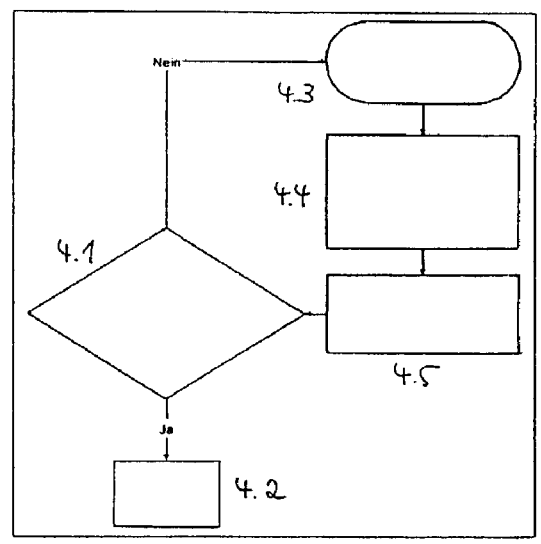
FIG. 4 A flow diagram of the monitoring of a movement state of the apparatus through the inventive motor current monitoring system.

FIG. 4 shows the flow chart of monitoring a movement state of apparatus 2.1 by the motor current monitoring system according to the invention. For this purpose there is initially a measurement of the motor currents 4.5 which really appear in the apparatus. The measured motor currents, plus corresponding tolerances, are subsequently compared with the theoretically expected motor currents 4.1, so that in the case of an excessive deviation an alarm message 4.2 is emitted. If such a deviation does not exist, the movement of the apparatus is continued 4.3 and theoretically occurring motor currents of the next movement segment are calculated by means of a mathematical model 4.4.

The alarm message 4.2 given in the case of a deviation of the measured motor currents from the motor currents theoretically expected can also be used for stopping a danger-bringing movement or for initiating a corresponding opposing movement.

Figure 5:
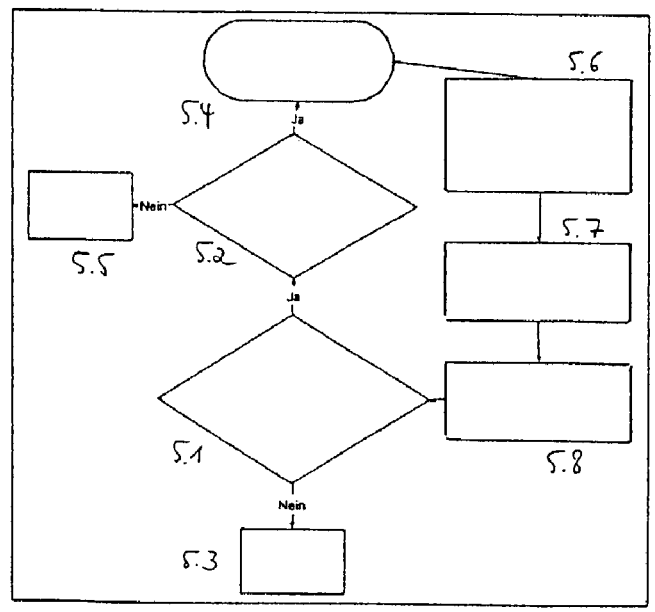
FIG. 5 A flow diagram of the combined movement monitoring of the apparatus by the motor current monitoring system and the force-moment sensors present according to the invention.

FIG. 5 shows the flow chart of a combined movement monitoring of apparatus 2.1 by the motor current monitoring system shown in FIG. 4 and an additionally provided force-moment sensor means.

The combined movement monitoring comprises a measurement of the really occurring motor currents 5.7 and a measurement of the forces and moments at an end effector (force-moment sensor) 5.8, on the basis of which there is initially a comparison of the theoretically expected and the measured motor currents 5.1. If the deviation is within a tolerance range, there is subsequently a check on the forces and moments at end effector 5.2. In the case of an excessive deviation of the measured from the theoretical motor currents an alarm message 5.3 is given . A corresponding alarm message 5.5 occurs when excessive forces and/or moments occur at the end effector 5.2. However, the movement of the apparatus is continued 5.4, if both the measured motor currents and also the measured forces and moments are within the given tolerance ranges. The continuation of the movement is linked with a calculation of the motor currents expected in the motors of the apparatus 2.1 using a mathematical model 5.6.

The invention claimed is:

1. A method for securing apparatuses with parts freely movable in space, particularly for handling equipment, such as industrial robots or driverless transportation means, with switching means, which in the case of a collision of moving parts with persons or objects, emit a control signal through which the moving pails can be stopped or an emergency program can be started up bringing about a movement sequence opposing the approach movement, wherein in the case of contact with a moving part of the apparatus, electromagnetic radiation guided by optical waveguides forming a tactile sensor system and located on said part is influenced, so that at least one control signal is emitted for initiating at least one safety-relevant action.

2. The method according to claim 1, wherein an approach of an object or a person to the movable part of the apparatus is detected prior to any contact through an additional, contactless sensor system and a control signal is emitted for bringing about at least one safety-relevant action.

3. The method according to claim 2, wherein said control signal is brought about by a change in the capacitance of at least one capacitor located on the movable part and which forms part of a capacitive sensor system.

4. The method according to claim 2, wherein the safety-relevant action is brought about by said control signal of said tactile sensor system and another control signal of a capacitive sensor system in the sense of a logic OR operation of the two control signal.

5. The method according to claim 2, wherein at least one area of a capacitive sensor system is blocked out, so that no control signal is emitted despite an approach having taken place.

6. The method according to claim 2, wherein a capacitive sensor system detects the objects and persons with a high permittivity coefficient.

7. The method according to claim 2, wherein a capacitive sensor system detects the persons and objects with a permittivity coefficient equal to or larger than 30.

8. The method according to claim 2, wherein, through a directivity of the elements of a capacitive sensor systems essentially no components of the apparatus are detected.

9. The method according to claim 1, wherein a collision between a moving part of the apparatus and an object or a person is detected by an additional motor current monitoring system, which emits another control signal after measuring currents in electric motors associated with the moving parts of the apparatus and alter a comparison of the measurement with a set of theoretically expected currents and in the case of a given deviation.

10. The method according to claim 9, wherein the collision is detected by at least one additional force-moment sensor, which emits a corresponding control signal if unusual forces and/or moments occur.

11. The method according to claim 10, wherein the safety-relevant-action is brought about by the control signal of the motor current monitoring system and/or the force-moment sensor means.

12. The method according to claim 1, wherein, through said control signal, one or more of the following safety-relevant actions are initiated:
   a) stopping the apparatus,
   b) initiating a movement sequence opposing the collision movement, or
   c) triggering an optical and/or acoustic alarm.

13. A method for securing apparatuses with parts freely movable in space, particularly for handling equipment, such as industrial robots or driverless transportation means, with switching means, which in the case of a collision of moving parts with persons or objects emit a control signal through which the moving parts can be stopped or an emergency program can be started up bringing about a movement sequence opposing the approach movement, wherein an approach of an objector person to the moveable part of the apparatus is detected prior to any contact through a first contactless sensor system and wherein in the case of contact with a moving part of the apparatus, electromagnetic radiation guided by optical waveguides forming a second tactile sensor system and located on said part is influenced, so that at least one control signal is emitted for initiating at least one safety-relevant action.

14. The method according to claim 2, wherein a capacitive sensor system detects the persons and objects with a permittivity coefficient in the range of 50.

* * * * *